United States Patent
Yang et al.

(10) Patent No.: US 12,296,820 B2
(45) Date of Patent: May 13, 2025

(54) METHOD AND APPARATUS FOR ASSISTING WITH COLLISION AVOIDANCE

(71) Applicants: HYUNDAI MOTOR COMPANY, Seoul (KR); KIA CORPORATION, Seoul (KR)

(72) Inventors: Dong Hun Yang, Anyang-si (KR); Byeong Hwa Kim, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 251 days.

(21) Appl. No.: 18/085,117

(22) Filed: Dec. 20, 2022

(65) Prior Publication Data

US 2023/0311861 A1    Oct. 5, 2023

(30) Foreign Application Priority Data

Mar. 31, 2022  (KR) .................. 10-2022-0040156

(51) Int. Cl.
*B60W 30/09* (2012.01)
*B60W 10/18* (2012.01)
*B60W 30/095* (2012.01)
*B60W 40/105* (2012.01)

(52) U.S. Cl.
CPC ............ *B60W 30/09* (2013.01); *B60W 10/18* (2013.01); *B60W 30/0956* (2013.01); *B60W 40/105* (2013.01); B60W 2540/18 (2013.01); B60W 2554/4041 (2020.02); B60W 2554/80 (2020.02); B60W 2556/40 (2020.02)

(58) Field of Classification Search
CPC .. B60W 30/09; B60W 10/18; B60W 30/0956; B60W 40/105; B60W 2540/18; B60W 2554/4041; B60W 2554/80; B60W 2556/40; B60W 2420/403; B60W 2520/10; B60W 2554/404; B60W 30/0953; B60W 30/095; B60W 30/08; B60W 40/072; B60W 2530/18; B60Q 1/346

See application file for complete search history.

(56) References Cited

U.S. PATENT DOCUMENTS

2020/0065665 A1\* 2/2020 Nageshrao ............... G06N 3/08

\* cited by examiner

*Primary Examiner* — Michael V Kerrigan
(74) *Attorney, Agent, or Firm* — Lempia Summerfield Katz LLC (57) ABSTRACT

Provided is a collision avoidance assistance device, comprising: a sensor unit that uses at least one sensor to detect a shape and a location of an object existing in a field of view (FOV); a map generator that generates a map including the shape and the location of the detected object; a driving information receiver that receives driving information including at least one of a real-time speed and a real-time steering angle of a vehicle from a communication terminal of the vehicle; a first determination unit that determines that the vehicle turns when the real-time steering angle is greater than or equal to a preset angle; a flag selector that selects flag-on when the vehicle turns and that selects flag-off otherwise; and a collision risk determination unit that determines whether there is a risk of collision between the vehicle and the object based on a determination algorithm or a map.

16 Claims, 13 Drawing Sheets

METHOD AND APPARATUS FOR ASSISTING WITH COLLISION AVOIDANCE

CROSS-REFERENCE TO RELATED APPLICATIONS

This application is based on, and claims priority to, Korean Patent Application Number 10-2022-0040156, filed Mar. 31, 2022, the disclosure of which is incorporated by reference herein in its entirety.

TECHNICAL FIELD

The present disclosure relates to a collision avoidance assistance device and method.

BACKGROUND

The content described in this part simply provides background information on the present disclosure and does not constitute the prior art.

As part of autonomous driving technology, collision-avoidance assist prevents collisions with surrounding objects. The surrounding objects may be other vehicles, people, facilities, and objects existing around the vehicle. This technology includes Forward Collision-Avoidance Assist (FCA) and Blind-Spot Collision-Avoidance Assist (BCA). FCA and BCA control a vehicle to avoid collision with objects detected in the front and rear sides of the vehicle, respectively, using a camera or the like.

In addition, there is a Parking Collision-Avoidance Assist (PCA) that prevents collisions with objects while the vehicle is parking.

Among the sensors used by the collision avoidance assistant technologies, the camera can accurately detect the shape of the object. However, it is difficult to detect the object when the detectable field of view is narrow and the illuminance is low. The camera may accurately identify the shape of the object existing on the lateral side of the vehicle, but it is difficult to accurately identify the movement of the object.

The prior art has a problem in that collision avoidance assistance systems are unnecessarily operated even when both the vehicle and the surrounding object turn.

The prior art has a problem in that the collision avoidance assistance system may not be operated when only the vehicle is turned and driven or that an object approaching the vehicle is not detected due to a narrow field of view of the camera.

SUMMARY

According to an embodiment of the present disclosure, a collision avoidance assistance device comprises: a sensor unit that uses at least one sensor to detect a shape and a location of an object existing in a field of view (FOV) of the sensor; a map generator that generates a map including the shape and the location of the detected object; and a driving information receiver that receives driving information including at least one of a real-time speed and a real-time steering angle of a vehicle from a communication terminal of the vehicle. The collision avoidance assistance device further comprises: a first determination unit that determines that the vehicle turns when the real-time steering angle is greater than or equal to a preset angle; a flag selector that selects flag-on when it is determined that the vehicle turns and that selects flag-off otherwise; and a collision risk determination unit that determines whether there is a risk of collision between the vehicle and the object based on a determination algorithm when the flag selector selects the flag-on, and a risk of collision between the vehicle and the object based on the map when the flag selector selects the flag-off.

According to an embodiment of the present disclosure, a collision avoidance assistance method comprises: detecting a shape and a location of an object existing in a FOV of at least one sensor using the at least one sensor; and generating a map including the shape and the location of the detected object; receiving driving information including one or both of a real-time speed and a real-time steering angle of a vehicle from a communication terminal of the vehicle. The collision avoidance assistance method further comprises: a first determination process of determining that the vehicle turns when the steering angle is greater than or equal to a preset angle; a flag selection process of selecting flag-on when it is determined that the vehicle turns and selecting flag-off otherwise; and a collision risk determination process of determining whether there is a risk of collision between the vehicle and the object based on a determination algorithm when the flag-on is selected in the flag selection process, and a risk of collision between the vehicle and the object based on the map when the flag-off is selected in the flag selection process.

BRIEF DESCRIPTION OF THE DRAWINGS

In order that the disclosure may be well understood, there will now be described various forms thereof, given by way of example, reference being made to the accompanying drawings, in which.

DETAILED DESCRIPTION

In view of the above, the present disclosure provides a collision avoidance assistance device capable of determining whether a vehicle turns.

Further, the present disclosure provides a collision avoidance assistance device capable of generating a map including shapes and locations of a vehicle and an object.

The objects to be achieved by the present disclosure are not limited to the above-mentioned objects. Other objects not mentioned should be clearly understood by those having ordinary skill in the art from the following description.

Some embodiments of the present disclosure are described in detail with reference to the accompanying drawings. In the following description, like reference numerals designate like elements, although the elements are shown in different drawings. Further, in the following description of some embodiments, a detailed description of related known components and functions when considered to obscure the subject of the present disclosure have been omitted for the purpose of clarity and for brevity.

In describing the components of embodiments, alphanumeric codes may be used such as "first," "second," "i)," "ii)," "a)," "b)," and the like, solely for the purpose of differentiating one component from others but not to imply or suggest the substances, the order, or sequence of the components. Throughout this specification, when parts "include" or "comprise" a component, they are meant to further include other components, not to exclude thereof unless there is a particular description contrary thereto.

When a component, device, element, or the like of the present disclosure is described as having a purpose or performing an operation, function, or the like, the component, device, or element should be considered herein as being "configured to" meet that purpose or to perform that operation or function.

Figure 1:
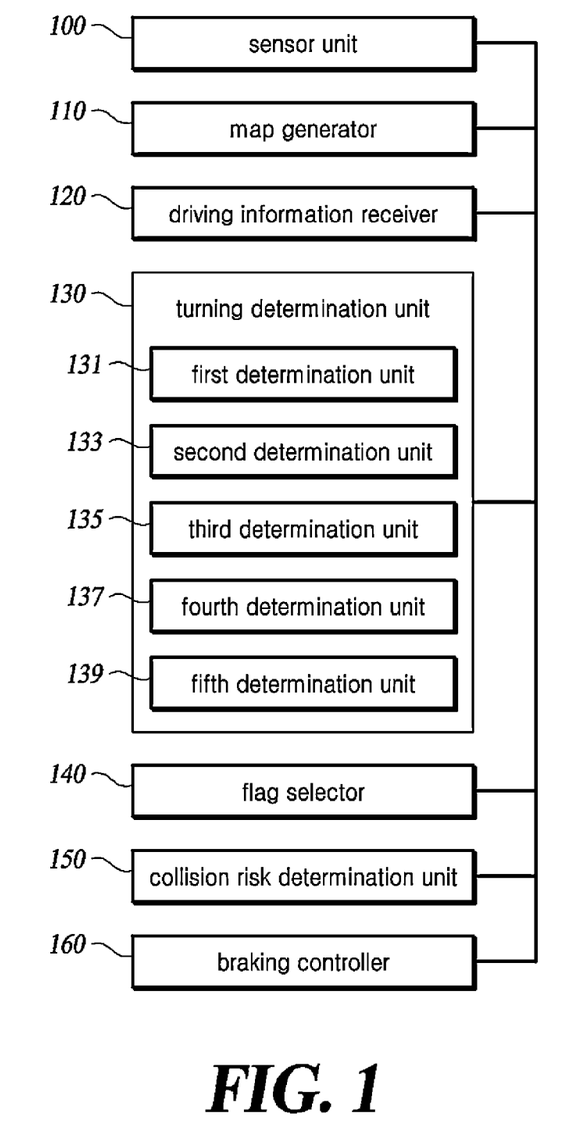
FIG. 1 is a block diagram of a collision avoidance assistance device, according to an embodiment of the present disclosure.

FIG. 1 is a block diagram of a collision avoidance assistance device, according to one embodiment of the present disclosure.

Referring to FIG. 1, the collision avoidance assistance device includes: all or part of a sensor unit 100; a map generator 110; a driving information receiver 120; a turning determination unit 130; a flag selector 140; a collision risk determination unit 150; and a braking controller 160.

The sensor unit 100 uses at least one sensor to detect an object existing in the field of view (FOV) of the sensor. The sensor includes: a camera; an ultrasonic; radar; and lidar sensors.

The map generator 110 generates a map based on the detected object. The map is an image or a video including shapes and locations of a vehicle and the detected object. The map generator 110 may calculate a distance between the vehicle and the object based on the location of the vehicle and the location of the object.

The driving information receiver 120 receives driving information from a communication terminal of the vehicle. The driving information includes a real-time speed and/or a real-time steering angle of the vehicle.

The turning determination unit 130 includes: all or part of a first determination unit 131; a second determination unit 133; a third determination unit 135; a fourth determination unit 137; and a fifth determination unit 139.

The first determination unit 131 determines whether the real-time steering angle is equal to or greater than a preset angle based on the driving information. The preset angle indicates an angle set by a designer. The designer may set it to a minimum angle or an angle more desired for turning. When the real-time steering angle is equal to or greater than the preset angle, the first determination unit 131 may determine that the vehicle starts turning.

When the first determination unit 131 determines that the vehicle starts turning, the second determination unit 133 calculates a moving distance of the vehicle for a preset time. When the calculated moving distance is greater than or equal to a preset distance, the second determination unit 133 determines that the vehicle turns. The preset distance may be a vertical or horizontal distance between the front end of the vehicle and a location of a sensor mounted to the vehicle.

When the second determination unit 133 determines that the vehicle turns, the third determination unit 135 determines whether the real-time speed of the vehicle is within a preset range based on the driving information. Specifically, the third determination unit 135 compares a preset reference speed with the real-time speed of the vehicle. The third determination unit 135 sets a greater one of the two speeds as a turning entry speed of the vehicle. When the difference between the real-time speed of the vehicle and the turning entry speed is within the preset range, the third determination unit 135 determines that the vehicle turns. The preset range may be arbitrarily set by a setter. For example, it is assumed that the setter sets the preset range between 2 kilometers per hour (km/h) and 0.5 km/h. If the difference between the real-time speed of the vehicle and the turning entry speed is 1 km/h, the third determination unit 135 may determine that the vehicle turns.

When the first determination unit 131 determines that the vehicle starts turning, the fourth determination unit 137 determines whether the vehicle maintains the turning. Specifically, the fourth determination unit 137 may determine that the turning is terminated when the steering angle is changed by a predetermined angle or more from the steering angle determined to start turning. For example, when the steering angle of the vehicle reaches 160 degrees to the left, the first determination unit 131 may determine that the vehicle starts turning. When the real-time steering angle reaches 90 degrees to the left from 160 degrees to the left, the fourth determination unit 137 may determine that the turning ends.

The map generator 110 may calculate a distance between the vehicle and the object based on the generated map. The fifth determination unit 139 determines whether the distance between the vehicle and the object is between a preset minimum value and a preset maximum value. The preset minimum and maximum values may be arbitrarily set by a setter. When the distance between the vehicle and the object is between the preset minimum value and the preset maximum value, the fifth determination unit 139 determines that the vehicle turns.

When the distance between the vehicle and the object exceeds the preset maximum value, the third determination unit 135 determines again whether the real-time speed of the vehicle is within the preset range based on the driving information. When the distance between the vehicle and the object is less than the preset minimum value, the fifth determination unit 139 may determine that either the vehicle or the object has ended the turning.

The flag selector 140 selects a flag-on or flag-off based on whether the vehicle turns. The flag may be a set value for displaying whether the vehicle turns. The flag selector 140 may select flag-on when the vehicle turns and select flag-off when the vehicle does not turn.

Flag-on may indicate when the vehicle and the object are simultaneously turning. Flag-off may indicate when the vehicle and/or the object are not turning.

When the distance calculated by the map generator 110 is zero "0", the fifth determination unit 139 may determine that no turning object is detected. The flag selector 140 maintains the selected flag for a predetermined time. The predetermined time may be a time period from the determination point of the fifth determination unit 139 until the sensor unit 100 detects a new object.

When the distance calculated by the map generator 110 is changed from zero "0" to a value other than zero "0" after the flag selector 140 selects the flag-on, the fifth determination unit 139 determines again whether the changed value is within the preset range.

The flag selector 140 selects flag-on or flag-off based on the determination result of the turning determination unit 130. The flag may be selected by using the determination result of the first determination unit 131 and by further using the determination results of all or part of the second to fifth determination units.

The collision risk determination unit 150 determines whether there is a risk of collision between the vehicle and the object. When the flag-on is selected, the collision risk determination unit 150 determines a collision risk between the vehicle and the object based on a conventional collision avoidance assisting function. When the flag-off is selected, the collision risk determination unit 150 determines a collision risk between the vehicle and the object based on the generated map.

When the collision risk determination unit 150 determines that there is a collision risk, the braking controller 160 controls a braking system of the vehicle to stop or decelerate the vehicle.

Figure 2:
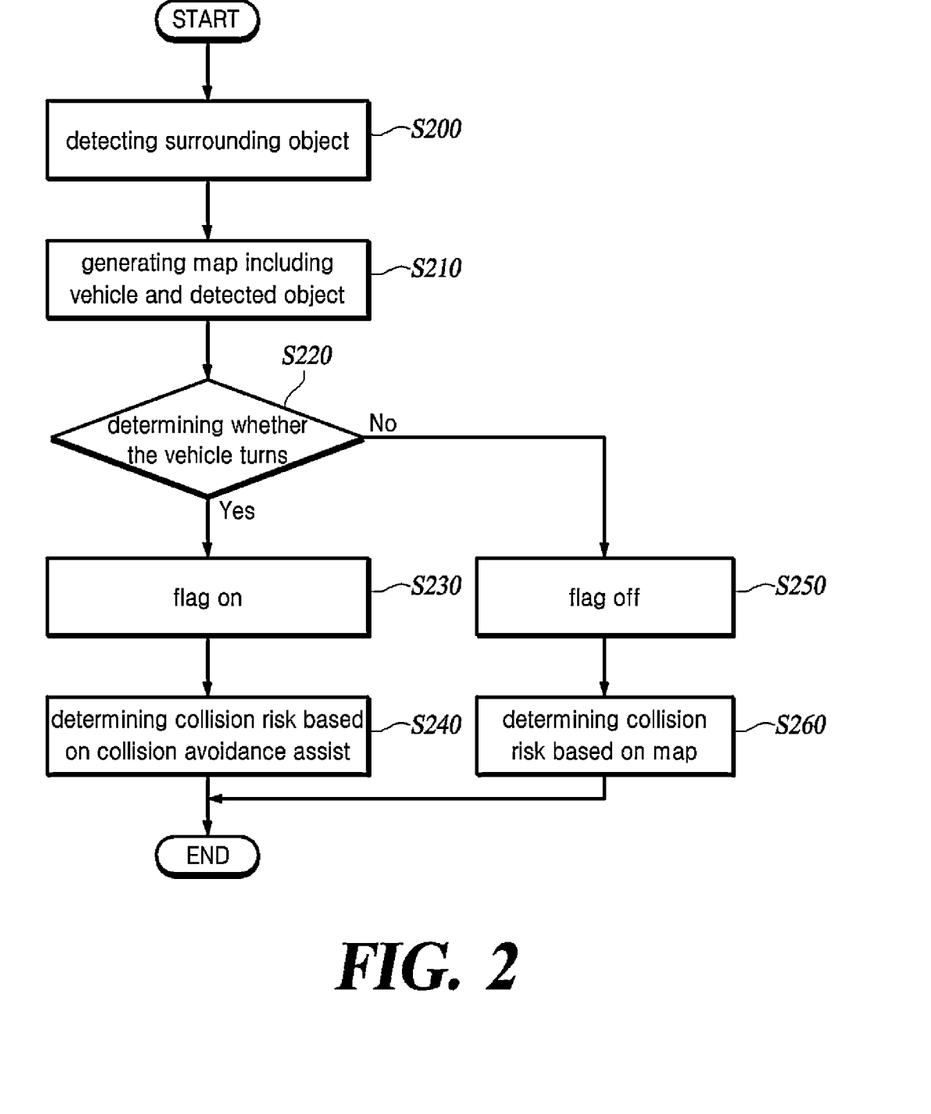
FIG. 2 is a flowchart of a collision avoidance assistance method, according to an embodiment of the present disclosure.

FIG. 2 is a flowchart of a collision avoidance assistance method, according to an embodiment of the present disclosure.

Referring to FIG. 2, the sensor unit 100 detects a shape and a location of an object around a vehicle (S200).

The map generator 110 generates a map including the shapes and the locations of the vehicle and the detected object (S210).

The driving information receiver 120 receives driving information including a real-time speed and/or a real-time steering angle of the vehicle from a communication terminal of the vehicle. The turning determination unit 130 determines whether the vehicle turns based on the driving information (S220).

When it is determined that the vehicle turns, the flag selector 140 selects flag-on (S230).

When the flag-on is selected, the collision risk determination unit 150 determines whether there is a risk of collision between the vehicle and the object based on a determination algorithm (S240).

When it is determined that the vehicle does not turn, the flag selector 140 selects the flag-off (S250).

When the flag-off is selected, the collision risk determination unit 150 determines whether there is a risk of collision between the vehicle and the object based on the map (S260).

Figure 3:
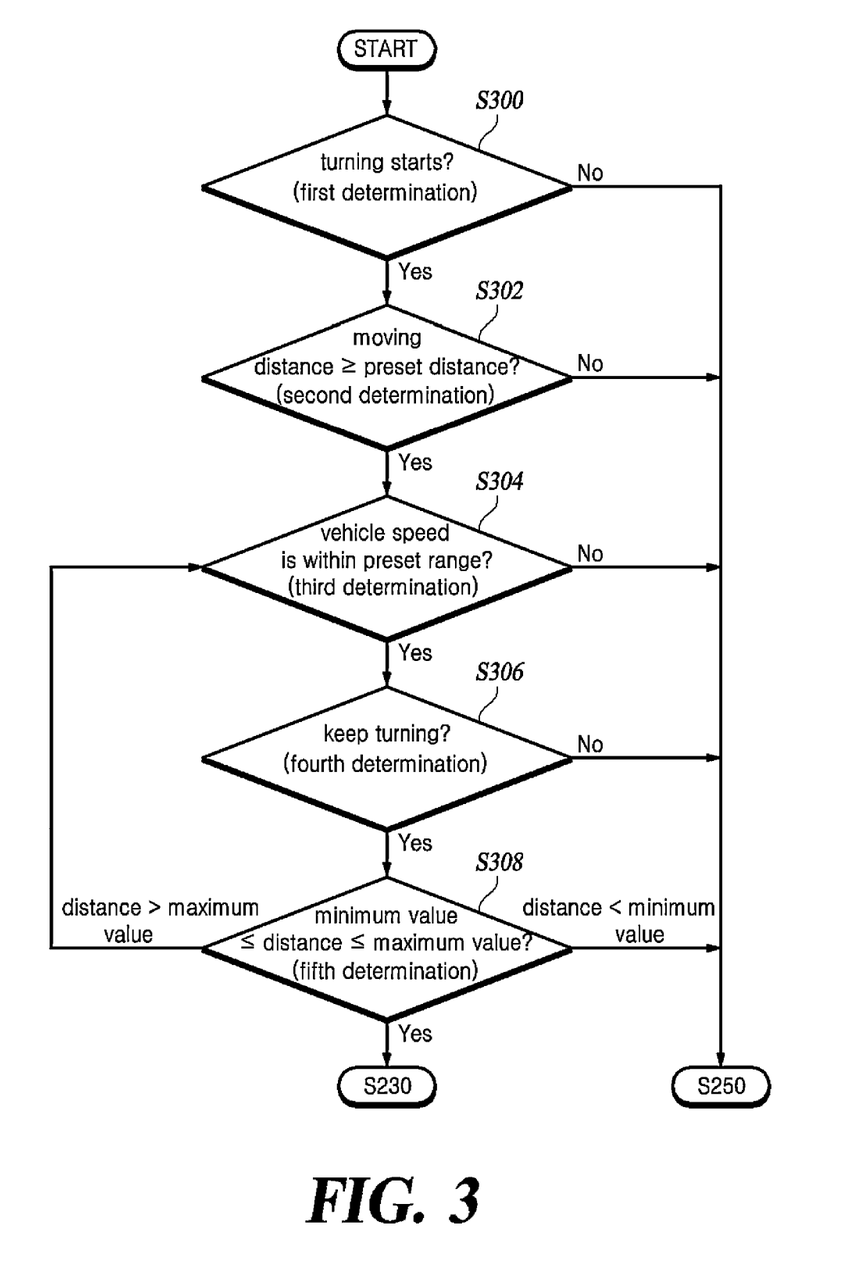
FIG. 3 is a flowchart of a method of determining whether a vehicle turns in the collision avoidance assistance method, according to an embodiment of the present disclosure.

FIG. 3 is a diagram illustrating a process of determining whether the vehicle turns in the collision avoidance assistance method, according to an embodiment of the present disclosure.

Referring to FIG. 3, the first determination unit 131 determines that the vehicle starts turning when the steering angle is equal to or greater than the predetermined angle. Otherwise, the process moves to step S250 (S300).

The second determination unit 133 calculates a distance traveled by the vehicle based on the driving information. The second determination unit 133 also determines that the vehicle turns when it is determined that the calculated distance is greater than or equal to the preset distance. Otherwise, the process moves to step S250 (S302).

The third determination unit 135 determines whether a real-time speed of the vehicle is within the preset range based on the driving information. When it is determined that the vehicle is within the preset range, the third determination unit 135 determines that the vehicle turns. Otherwise, the process moves to step S250 (S304).

The fourth determination unit 137 determines whether the amount of change in the steering angle is equal to or greater than a predetermined amount of change. When it is determined that the change amount is less than the predetermined amount of change, the fourth determination unit 137 determines that the vehicle maintains the turning. When it is determined that the steering angle is changed by an amount equal to greater than the predetermined amount of change, the fourth determination unit 137 determines that the turning has ended. The process moves to step S250 (S306).

The map generator 110 calculates a distance between the vehicle and the object based on the location of the vehicle and the detected object. When the calculated distance is greater than or equal to the preset minimum value and less than or equal to the preset maximum value, the fifth determination unit 139 determines that the vehicle turns. When the calculated distance exceeds the preset maximum value, the process returns to step S304. When the calculated distance is less than the preset minimum value, the process moves to step S250 (S308).

Figure 4A:
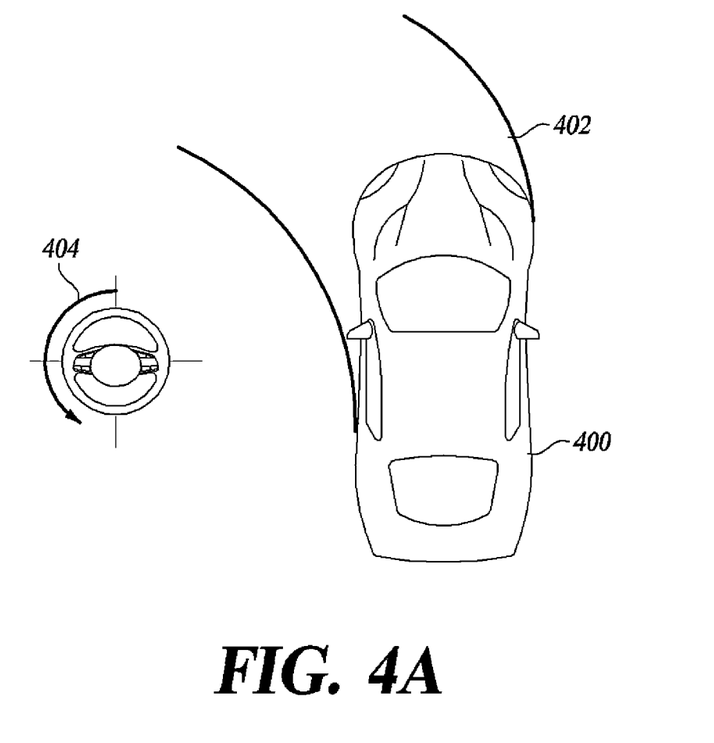
FIGS. 4A and 4B are diagrams of a process in which the collision avoidance assistance device, according to an embodiment of the present disclosure, determines whether the vehicle starts turning.
Figure 4B:
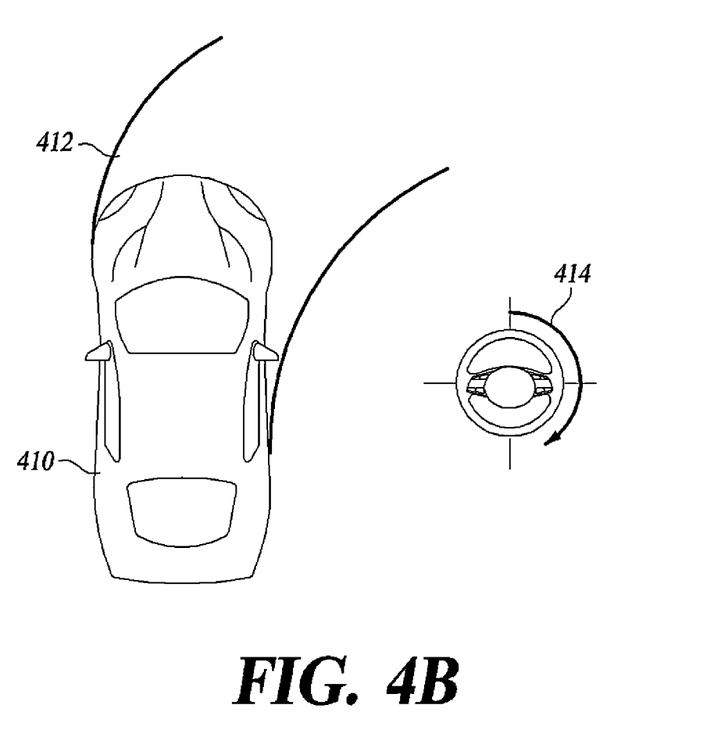

FIGS. 4A and 4B are diagrams of a process in which the collision avoidance assistance device, according to an embodiment of the present disclosure, determines whether the vehicle starts turning.

Referring to FIG. 4A, the diagram illustrates the vehicle 400 traveling on a left curved road 402. When the real-time steering angle 404 is equal to or greater than the preset angle, the collision avoidance assistance device determines that the vehicle 400 starts turning.

FIG. 4B shows the same content as that in FIG. 4A, but the vehicle 410 drives on a right curved road 412 and the real-time steering angle 414 is based on the right side.

Figure 5A:
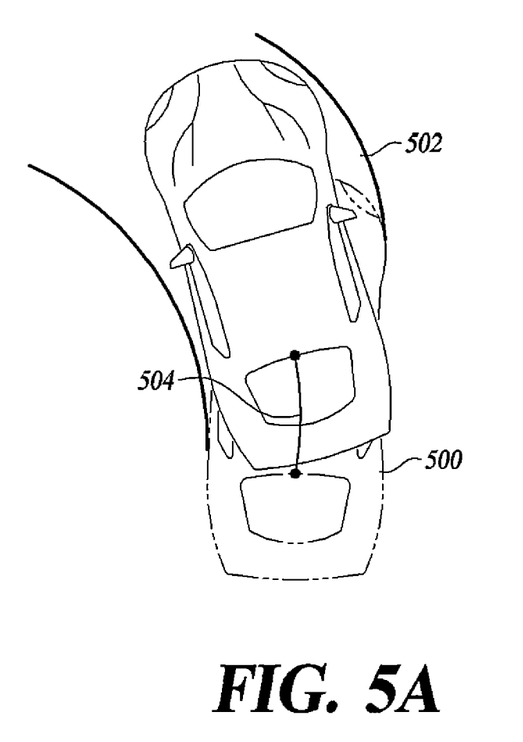
FIGS. 5A and 5B are diagrams of a process in which the collision avoidance assistance device, according to an embodiment of the present disclosure, calculates a distance traveled for a preset time in the process in which the vehicle turns.
Figure 5B:
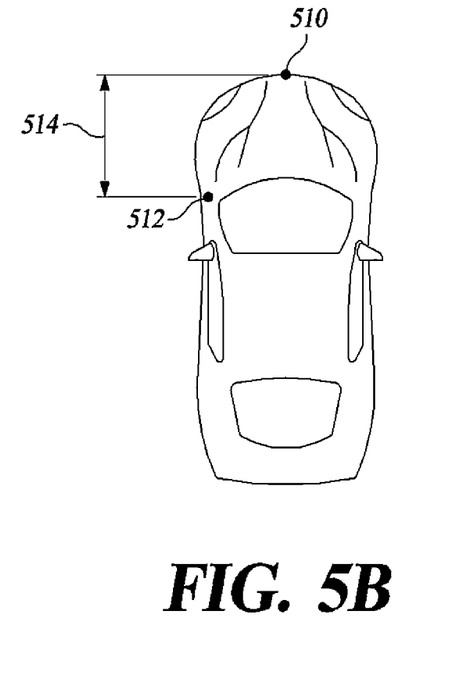

FIGS. 5A and 5B are diagrams of a process in which the collision avoidance assistance device, according to an embodiment of the present disclosure, calculates a distance traveled for a predetermined time in the process in which the vehicle turns.

Referring to FIG. 5A, there is the vehicle 500 before movement and the vehicle 502 after movement with reference to the predetermined time. The moving distance 504 may be calculated based on the location of the center between the rear wheels of the vehicle 500 before movement and that of the vehicle 502 after movement.

Referring to FIG. 5B, there is a location 510 of the front end of the vehicle and a location 512 of a sensor mounted on the vehicle. The vertical distance 514 of these two locations becomes a reference distance, and the second determination unit 133 may determine that the vehicle turns when the moving distance 504, illustrated in FIG. 5A, is greater than or equal to the vertical distance 514.

Figure 6A:
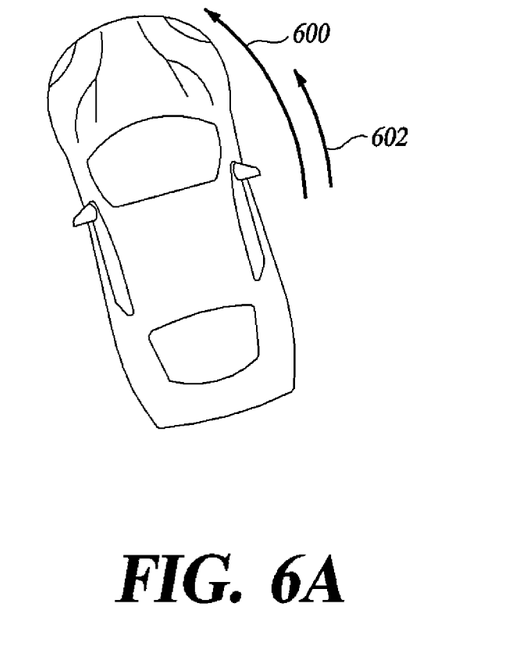
FIGS. 6A and 6B are diagrams of a process in which the collision avoidance assistance device, according to an embodiment of the present disclosure, calculates speed of the vehicle in real-time in the process in which the vehicle turns.
Figure 6B:
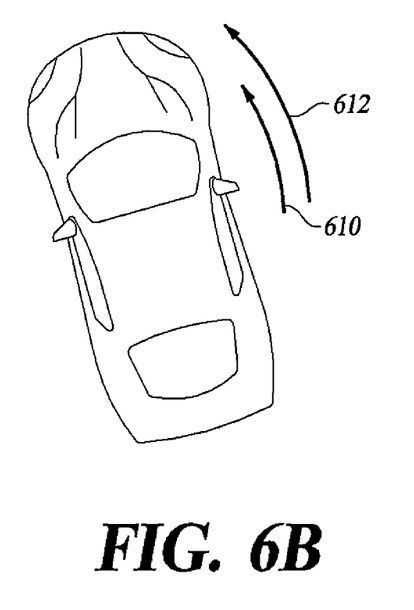

FIGS. 6A and 6B are diagrams of a process in which the collision avoidance assistance device, according to an embodiment of the present disclosure, calculates the speed of the vehicle in real-time in the process in which the vehicle turns.

Referring to FIG. 6A, vehicle speeds 600 and 610 and reference speeds 602 and 612 are illustrated. The direction and length of each arrow correspond to the direction and magnitude of the velocity. The direction and magnitude of the reference speed 602 illustrated in FIG. 6A and the reference speed 612 illustrated in FIG. 6B are the same. The third determination unit 135 sets one of the vehicle speeds 600 and 610 and the reference speeds 602 and 612 as a turning entry speed and determines whether a difference between the vehicle speeds 600 and 610 and the turning entry speed is within the preset range.

Referring to FIG. 6A, the vehicle speed 600 is greater than the reference speed 602. The third determination unit 135 sets the vehicle speed 600 as the turning entry speed.

Referring to FIG. 6B, the vehicle speed 610 is less than the reference speed 612. The third determination unit 135 sets the reference speed 612 as the turning entry speed.

Figure 7A:
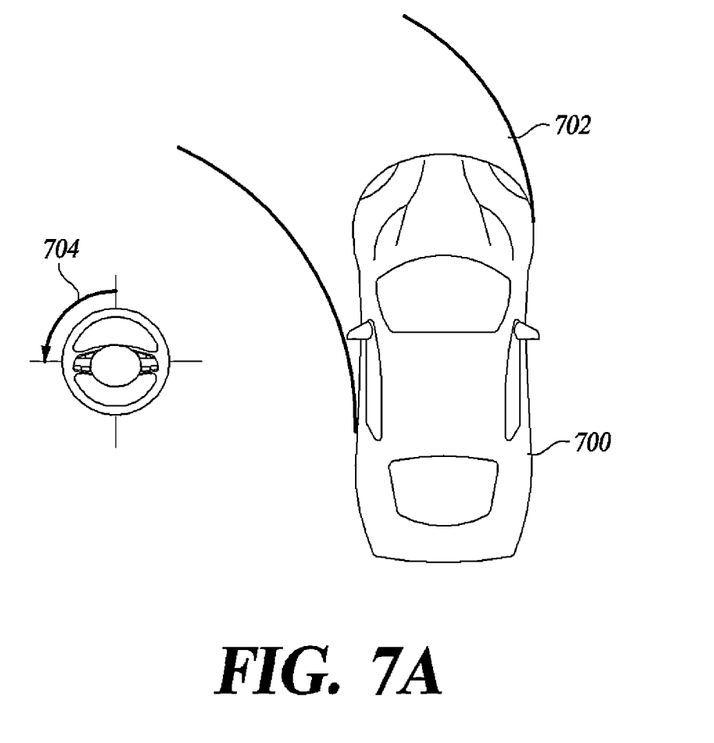
FIGS. 7A and 7B are diagrams of a process of determining whether the collision avoidance assistance device, according to an embodiment of the present disclosure, starts turning and maintains the turning for a predetermined time.
Figure 7B:
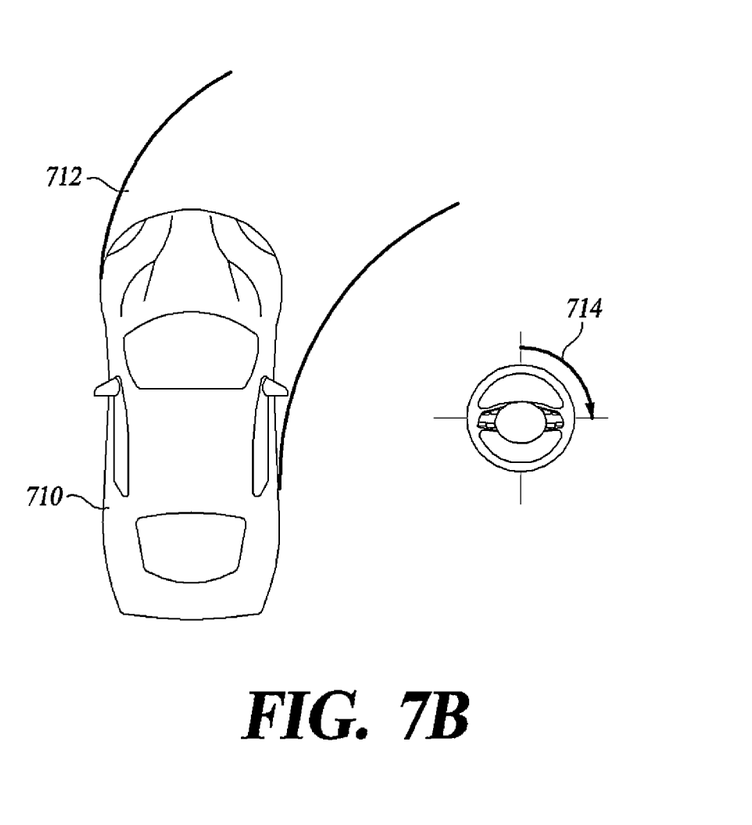

FIGS. 7A and 7B are diagrams of a process of determining whether the collision avoidance assistance device, according to an embodiment of the present disclosure, starts turning and maintains the turning for the predetermined time.

Referring to FIG. 7A, assuming that the steering angle when the first determination unit 131 determined that the vehicle driving on the left curved road 702 starts turning is 160 degrees to the left, when the real-time steering angle 704 becomes 90 degrees to the left, the fourth determination unit 137 determines that the vehicle's turning ends. Specifically, when the steering angle is changed by an amount equal to or greater than the preset change amount with reference to the steering angle when the start of turning is determined, the fourth determination unit 137 determines that the vehicle's turning ends.

FIG. 7B shows the same content as that in FIG. 7A, but the vehicle 710 drives on the right curved road 712 and the real-time steering angle 714 is based on the right side.

Figure 8A:
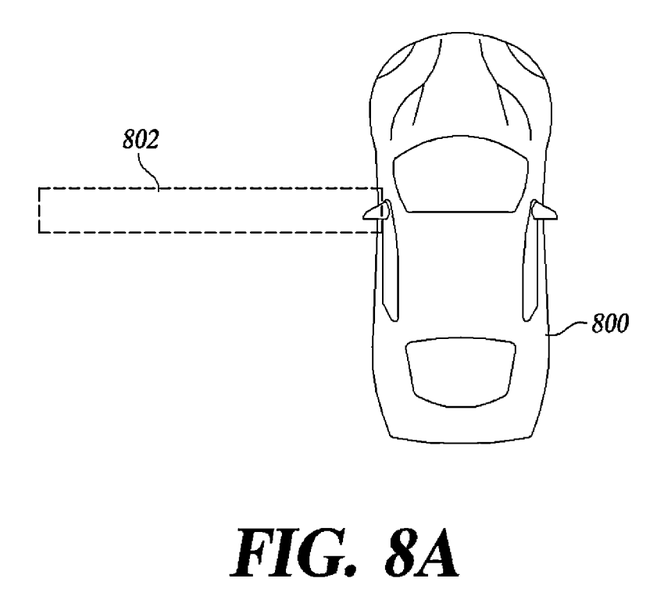
FIGS. 8A and 8B are diagrams of a process in which the collision avoidance assistance device, according to an embodiment of the present disclosure, determines a distance between the vehicle and surrounding objects.
Figure 8B:
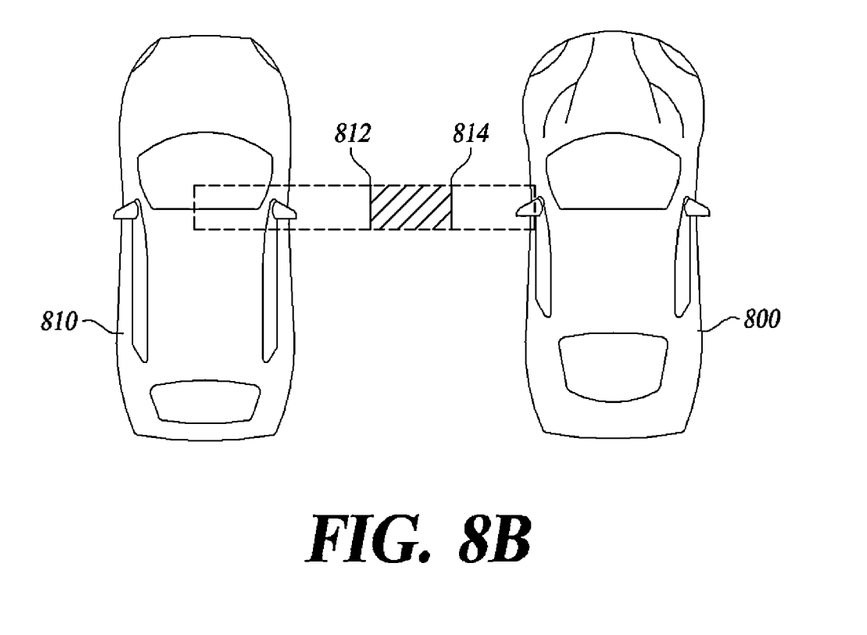

FIGS. 8A and 8B are diagrams of a process in which the collision avoidance assistance device, according to an embodiment of the present disclosure, determines the distance between the vehicle and the surrounding object.

Referring to FIG. 8A, there is a section 802 which is used to calculate the distance between the vehicle 800 and the object based on the location of the sensor mounted on the vehicle 800.

Referring to FIG. 8B, there is another vehicle 810 that is one of the detected objects. The map generator 110 calculates the distance between the vehicle and the object based on the section 802 used to calculate the distance. When the calculated distance is less than or equal to a minimum separation distance 814 and greater than or equal to a maximum separation distance 812, the fifth determination unit 139 determines that the vehicle turns.

Various implementations of the systems and techniques described herein may be realized by a digital electronic circuit, an integrated circuit, a field programmable gateway (FPGA), an application specific integrated circuit (ASIC), computer hardware, firmware, software, and/or a combination thereof. These various implementations may include an implementation by one or more computer programs executable on a programmable system. The programmable system includes: at least one programmable processor (which may be a special purpose processor or a general-purpose processor) coupled to a storage system; at least one input device; and at least one output device to receive and transmit data and instructions therefrom and thereto. Computer programs (also known as programs, software, software applications or code) contain instructions for the programmable processor and are stored in a "computer-readable recording medium".

Although it is described that the processes are sequentially executed in the flowchart of the present disclosure, this is merely illustrative of the technical idea of an embodiment of the present disclosure. The flowchart is not limited to a time-series order since a person having ordinary skill in the art may: change the order of the processes described in the flowchart; or perform one or more of the processes in parallel without departing from the essential characteristics of an embodiment of the present disclosure.

According to an embodiment, since the collision avoidance assistance device can determine whether the vehicle turns, it is possible to prevent unnecessary braking from being performed when both the vehicle and the surrounding object turn.

According to an embodiment, the collision avoidance assistance device can determine whether there is a risk of collision between the vehicle and the object by using the generated map, and thus can compensate for erroneous braking and non-braking of the collision avoidance assistance device.

Although embodiments of the present disclosure have been described for illustrative purposes, those having ordinary skill in the art should appreciate that various modifications, additions, and substitutions are possible, without departing from the idea and scope of the present disclosure. Therefore, embodiments of the present disclosure have been described for the sake of brevity and clarity. The scope of the technical idea of embodiments of the present disclosure should not be limited by the illustrations. Accordingly, one of ordinary skill should understand that the scope of the present disclosure should not be limited by the above described embodiments but by the claims and equivalents thereof.

What is claimed is:

1. A collision avoidance assistance device, comprising:
   a sensor unit that uses at least one sensor to detect a shape and a location of an object existing in a field of view (FOV) of the sensor;
   a map generator that generates a map including the shape and the location of the detected object;
   a driving information receiver that receives driving information including at least one of a real-time speed and a real-time steering angle of a vehicle from a communication terminal of the vehicle;
   a first determination unit that determines that the vehicle turns when the real-time steering angle is greater than or equal to a preset angle;
   a flag selector that selects flag-on when it is determined that the vehicle turns and that selects flag-off otherwise; and
   a collision risk determination unit that determines whether there is a risk of collision between the vehicle and the object based on a determination algorithm when the flag selector selects the flag-on, and that determines whether there is a risk of collision between the vehicle and the object based on the map when the flag selector selects the flag-off.

2. The collision avoidance assistance device of claim 1, further comprising a second determination unit that, when the first determination unit determines that the vehicle turns, calculates a moving distance of the vehicle based on the driving information, and determines that the vehicle turns when the calculated moving distance is determined to be more than a preset distance,
   wherein the flag selector selects one of the flag-on and the flag-off based on the determination of the second determination unit.

3. The collision avoidance assistance device of claim 2, further comprising a third determination unit that, when the second determination unit determines that the vehicle turns, determines whether the real-time speed of the vehicle is within a preset range based on the driving information, and determines that the vehicle turns when the real-time speed of the vehicle is within the preset range,
wherein the flag selector selects one of the flag-on and the flag-off based on the determination of the third determination unit.

4. The collision avoidance assistance device of claim 1, further comprising a fourth determination unit that, when the real-time steering angle is changed by an amount equal to or greater than a predetermined amount of change from the steering angle when the first determination unit determined that the vehicle turns, determines that turning of the vehicle ends,
wherein the flag selector selects one of the flag-on and the flag-off based on the determination of the fourth determination unit.

5. The collision avoidance assistance device of claim 1, wherein: the map generator calculates a distance between the vehicle and the object based on the generated map, the collision avoidance assistance device further comprising a fifth determination unit that, when the calculated distance is between a preset minimum value and a preset maximum value, determines that the vehicle turns, and
wherein the flag selector selects one of the flag-on and the flag-off based on the determination of the fifth determination unit.

6. The collision avoidance assistance device of claim 5, wherein when the distance calculated by the map generator is zero "0", the flag selector is configured to maintain the selected flag for a predetermined time.

7. The collision avoidance assistance device of claim 6, wherein when the distance calculated by the map generator is changed to a value other than zero "0" after the flag selector selects the flag-on, the fifth determination unit determines whether the changed distance is between the preset minimum value and the preset maximum value.

8. The collision avoidance assistance device of claim 1, further comprising a braking controller that controls a braking system of the vehicle when the collision risk determination unit determines that there is a risk of collision between the vehicle and the object.

9. A collision avoidance assistance method, comprising:
detecting a shape and a location of an object existing in a field of view (FOV) of at least one sensor using the at least one sensor;
generating a map including the shape and the location of the detected object;
receiving driving information including one or both of a real-time speed and a real-time steering angle of a vehicle from a communication terminal of the vehicle;
a first determination process of determining that the vehicle turns when the steering angle is greater than or equal to a preset angle;
a flag selection process of selecting flag-on when it is determined that the vehicle turns and selecting flag-off otherwise; and
a collision risk determination process of determining whether there is a risk of collision between the vehicle and the object based on a determination algorithm when the flag-on is selected in the flag selection process and a risk of collision between the vehicle and the object based on the map when the flag-off is selected in the flag selection process.

10. The collision avoidance assistance method of claim 9, further comprising a second determination process of calculating, when it is determined that the vehicle turns in the first determination process, a moving distance of the vehicle based on the driving information, and determining that the vehicle turns when the calculated moving distance is determined to be greater than or equal to a preset distance,
wherein in the flag selection process, one of the flag-on and the flag-off is selected based on the determination of the second determination process.

11. The collision avoidance assistance method of claim 10, further comprising a third determination process of determining whether the real-time speed of the vehicle is within a preset range based on the driving information when it is determined that the vehicle turns in the second determination process, and determining that the vehicle turns when the real-time speed of the vehicle is within the preset range,
wherein in the flag selection process, one of the flag-on and the flag-off is selected based on the determination of the third determination process.

12. The collision avoidance assistance method of claim 9, further comprising a fourth determination process of determining that the turning of the vehicle ends when the real-time steering angle is changed by an amount equal to or greater than a predetermined amount of change from the steering angle when the first determination process determined that the vehicle turns,
wherein in the flag selection process, one of the flag-on and the flag-off is selected based on the determination of the fourth determination process.

13. The collision avoidance assistance method of claim 9, wherein in the generating of the map, a distance between the vehicle and the object is calculated based on the generated map,
the collision avoidance assistance method further comprising:
a fifth determination process of determining that the vehicle turns when the calculated distance is between a preset minimum value and a preset maximum value,
wherein in the flag selection process, one of the flag-on and the flag-off is selected based on the determination of the fifth determination process.

14. The collision avoidance assistance method of claim 13, wherein when the calculated distance is zero "0" in the flag selection process, the selected flag is maintained for a predetermined time.

15. The collision avoidance assistance method of claim 14, wherein when the calculated distance is changed to a value other than zero "0" after the flag-on is selected in the flag selection process, it is determined whether the changed value is between the preset minimum value and the preset maximum value in the fifth determination process.

16. The collision avoidance assistance method of claim 9, further comprising controlling a braking system of the vehicle when it is determined that there is a risk of collision between the vehicle and the object in the collision risk determination process.

* * * * *